US012803157B2

(12) United States Patent
Sung et al.

(10) Patent No.: US 12,803,157 B2
(45) Date of Patent: Nov. 17, 2026

(54) KICKSTAND WITH INTEGRATED ANTENNA

(71) Applicant: Intel Corporation, Santa Clara, CA (US)

(72) Inventors: Gavin Sung, Taipei (TW); Jayprakash Thakur, Bangalore (IN); Prakash Kurma Raju, Bangalore (IN); Madhukiran Srinivasareddy, Bangalore (IN); Smit Kapila, Bangalore (IN); Maruti Tamrakar, Durg (IN); Khader Shareef Ismail Sherif, Bengaluru (IN); Vijith Halestoph R, Bangalore (IN); Sathiya Seelan Sekar, Salem (IN)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 17/878,527

(22) Filed: Aug. 1, 2022

(65) Prior Publication Data

US 2023/0028777 A1 Jan. 26, 2023

(51) Int. Cl.

*H01Q 1/44* (2006.01)
*H01Q 1/22* (2006.01)
*H01Q 1/24* (2006.01)

(52) U.S. Cl.

CPC ............. *H01Q 1/44* (2013.01); *H01Q 1/2291* (2013.01); *H01Q 1/244* (2013.01)

(58) Field of Classification Search

CPC ........ H01Q 1/44; H01Q 1/2291; H01Q 1/244; H01Q 1/2258

See application file for complete search history.

(56) References Cited

U.S. PATENT DOCUMENTS

| | | | | |
|---|---|---|---|---|
| 8,654,030 | B1 * | 2/2014 | Mercer | H04B 1/3833 343/893 |
| 9,134,808 | B2 * | 9/2015 | Siddiqui | G06F 3/0414 |
| 9,276,624 | B2 * | 3/2016 | Karacaoglu | H04B 1/18 |
| 9,667,290 | B2 * | 5/2017 | Ouyang | H01Q 1/2283 |
| 9,752,361 | B2 * | 9/2017 | Park | F16M 11/10 |
| 9,964,998 | B2 * | 5/2018 | Park | E05D 11/1064 |
| 2012/0194393 | A1 * | 8/2012 | Uttermann | H01Q 1/526 343/702 |
| 2013/0286623 | A1 * | 10/2013 | Slipy | H04M 1/0202 361/807 |
| 2016/0202733 | A1 * | 7/2016 | Ho | G06F 1/1667 361/679.12 |

* cited by examiner

*Primary Examiner* — Daniel D Chang

(74) *Attorney, Agent, or Firm* — Banner & Witcoff, Ltd.

(57) ABSTRACT

A kickstand for ergonomically positioning a computer device is equipped with an integrated antenna. In embodiments, the kickstand stores into a recess on a computer device, and can be deployed to help place the computer device into an ergonomic position. A switch or other sensor in the computer device may detect when the kickstand is deployed, and switch a radio within the computer device from an internal antenna to the antenna integrated into the kickstand. Other embodiments may be described and/or claimed.

18 Claims, 10 Drawing Sheets

KICKSTAND WITH INTEGRATED ANTENNA

TECHNICAL FIELD

Disclosed embodiments are directed to supports for computer devices, and in particular to kickstands with integrated antennas to detect stand configuration.

BACKGROUND

Portable computer devices allow people to accomplish work and get online from virtually anywhere. Such devices typically go online and otherwise communicate with external networks via a wireless connection, such as over WiFi or via a cellular connection. Because of their portability and ability to operate without the need for external cable or wired connections, such computer devices may be used in a variety of settings, such as inside homes or offices, in the field, in a vehicle such as an airplane or train, in restaurants or coffee shops, or other suitable locations. Portable computer devices may be used as part of a desktop configuration, such as with a docking station or port expander, or may be used stand-alone, such as in a clamshell mode on a table, a tray, on a user's lap, or another suitable surface. Such devices may be adjustable to facilitate a wide variety of use settings.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1A:
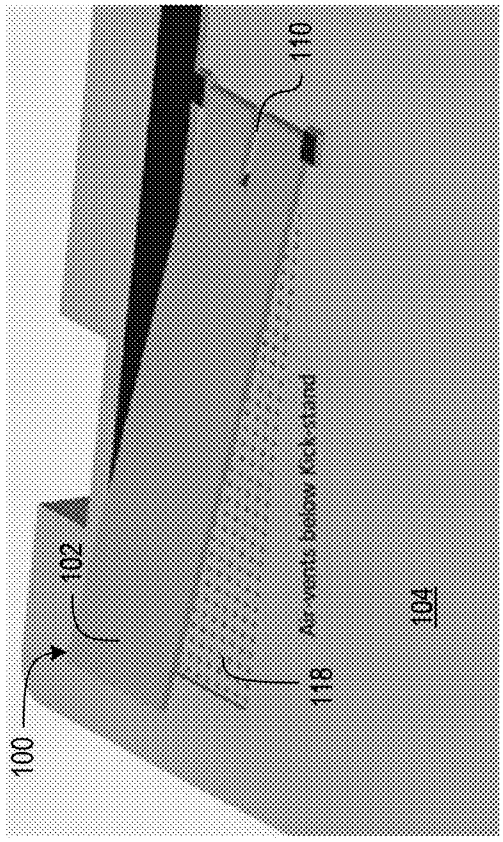
FIG. 1A illustrates where an example kickstand for a computer device that includes an integrated antenna attaches to the computer device, according to various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Because portable computer devices are usable in wide variety of settings, a user may use such a device in settings that may not be conducive to a good posture, e.g. lack of a proper desk at a suitable height, lack of an adjustable office chair, etc. Furthermore, typical portable computer devices such as laptops and tablets may be equipped with an external or physical keyboard, which can cause injury if used in an improper position over long periods. Even when a portable computer device is used at a suitable desk, the laptop or tablet form factor may not allow a user to find an ergonomic position without requiring use of an external keyboard and monitor, or even a docking station. A user will not typically carry around such external accessories even when a desk is available.

Furthermore, as the design of portable computer devices moves to an increasing use of metallic cases coupled with screens that extend to the case edge as much as possible, the positioning of wireless antennas, which cannot be placed within metal housings, becomes problematic. Antennas end up being located in any spot that is not blocked by metal, which may result in antenna placement that only offers good reception in certain directions. Furthermore, typical spots that are not blocked by metal may nevertheless be in close proximity to metal, which can adversely affect antenna performance. For example, in some use scenarios such as a closed laptop lid or if a laptop can be placed into a tablet mode, with the lid wrapped around to the underside of a laptop, the lid may be placed in close proximity to the antenna(e). If the lid is made of metal, the closer it is in proximity to an antenna, the more severely the antenna's performance may be degraded. If a user cannot orient the device so that the wireless base station is in an optimal direction, unstable, unreliable, and reduced speed connections may result.

Disclosed embodiments are directed to kickstands for mobile and portable computer devices such as laptops and tablets that include embedded antennas. The disclosed kickstands may allow a portable computer device to be placed in a more ergonomic position for a user without the need of external supports or external devices. Such stands, in embodiments, may allow for a range of adjustments so a user can position a computer device at an optimal angle for a wide variety of surfaces. Furthermore, disclosed kickstands offer a surface upon which an antenna can be placed, allowing the antenna to be moved away upon kickstand deployment from the computer device body, which may be metallic, and thereby improve wireless performance. In some embodiments, the external antenna integrated into the kickstand may be equipped to a computer device in addition to an internal antenna, and the computer device may be configured to switch between the internal and the kickstand antenna on a selective basis, such as when the kickstand is in a deployed position. Other possible embodiments will be discussed herein.

FIGS. 1A-D illustrate an example kickstand 100 that may be equipped to a computer device, such as computer device 1500, that incorporates an embedded antenna for transmitting and receiving wireless signals, such as WiFi, Bluetooth, cellular signals such as a LTE and 5G, and/or any other suitable wireless transmissions. The computer device may be a portable device, such as a laptop or tablet, or may be any other computer or electronic device that can benefit from a kickstand with an embedded or integrated antenna. Kickstand 100 includes a support 102 that secures to a base 104 of a computer device via one or more hinges or pivot points 106*a*, 106*b*. The kickstand 100 further includes an embedded or integrated antenna 108. The antenna 108 may be fed from the computer device via a feed cable 112, which connects to one or more radios located within the computer device. Base 104, in embodiments, is a part of the computer device, such as the bottom case. The configuration of base 104 will be discussed in greater detail with reference to FIGS. 2A and 2B.

Figure 1B:
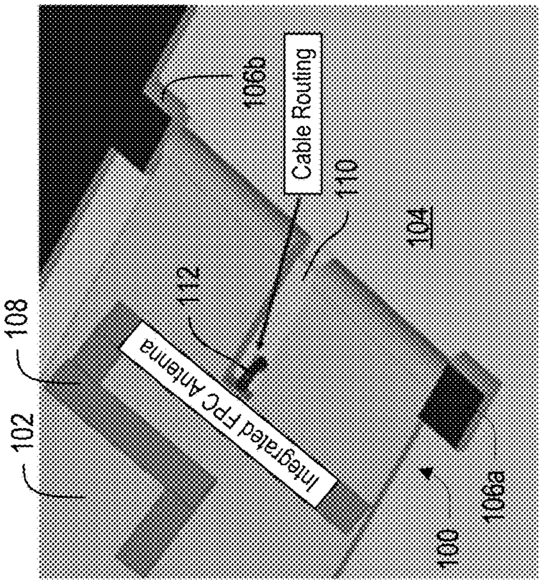
FIG. 1B is a close-up view of the example kickstand of FIG. 1A where it attaches to the computer device, according to various embodiments.

In the depicted embodiment, kickstand 100 secures to base 104 by inserting into hinges 106*a* and 106*b*. Support 102 may include a notch 110 to allow the end of support 102 to be flexed for insertion into hinges 106*a* and 106*b*. As can be seen in FIG. 1B, in the depicted embodiment notch 110 also provides a convenient path for feed cable 112. FIG. 1A depicts the kickstand 100 in a deployed position, where it inclines at an angle away from base 104 by pivoting on hinges 106*a* and 106*b*. When deployed, in some embodiments, kickstand 100 may uncover one or more air vents 118, to enhance ventilation of the computer device. The presence or absence of air vents 118, and the specific size and configuration of air vents 118, in base 104 may depend upon the specific heat dissipation requirements and ventilation system design of a given computer device.

Antenna 108 may be manufactured from any suitable material that is useable to transmit and receive radio waves for the radio connected to antenna 108, and is compatible with support 102. Such material may be a metal or conductive composite. In some embodiments, antenna 108 may be printed or screened onto support 102, such as with a metal printing process or silkscreen process. In other embodiments, antenna 108 may be manufactured from a foil or other flat material that is either bonded to support 102, such as with an adhesive, or manufactured into support 102, such as via lamination or other process for embedding antenna 108. Depending on how antenna 108 is integrated into support 102, it may not be readily visible. The specific configuration of antenna 108, such as the turns or folds, and dimensions, may depend upon the specifics of a given embodiment. For example, the frequencies intended to be received and transmitted through antenna 108 may impact its size, along with other factors including the type of radio to be connected to antenna 108 and target range of transmission and reception. Specific patterns for antenna 108 will be discussed below, in reference to FIGS. 7 and 8.

As mentioned above, feed cable 112 connects antenna 108 to a radio or radios within the computer device. Feed cable 112 may be any suitable conductor that can properly conduct the radio frequency (RF) energy produced by the radio to the antenna 108. Feed cable 112 may be designed to minimize RF loss and leakage between the radio and the antenna 108, so that antenna 108 can be most efficiently used. As will be understood by a person skilled in the relevant art, feed cable 112 may need to be sufficiently long and have sufficient slack to allow the kickstand 100 to be fully deployed away from base 104 without being subjected to excessive strain.

Figure 1C:
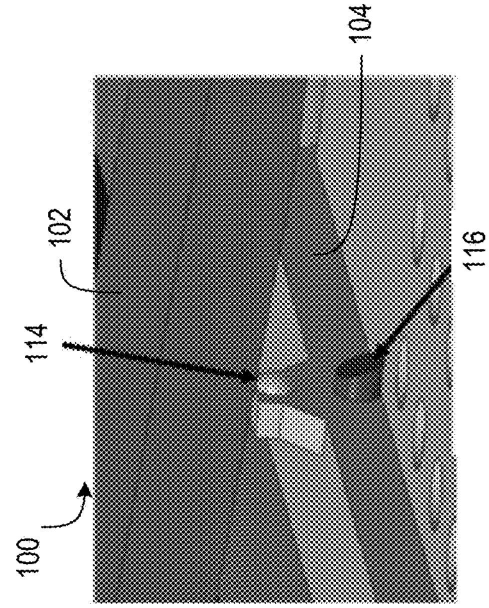
FIG. 1C illustrates a retention tab and micro switch on a computer device that interact with the example kickstand of FIG. 1A, according to various embodiments.

FIG. 1C depicts one possible mechanism by which kickstand 100 may be retained in either a deployed or stowed position. Support 102 may interact with a protrusion 114 that extends from base 104. The protrusion 114, which may be somewhat flexible to allow slight bending, extends into the arcuate path traveled by the support 102 as kickstand 100 moves between a deployed position and a stored position, pivoting on the end of support 102 that is secured into hinges 106*a* and 106*b*. In embodiments, protrusion 114 is positioned just above support 102 when support 102 is in a stored position. In this position, protrusion 114 acts to provide resistance against kickstand 100 inadvertently moving out of or into a stored position, and so retains kickstand 100 in either its stored position or deployed position unless a sufficient force is applied to kickstand 100 to allow support 102 to move past protrusion 114. The flexibility of protrusion 114 and/or support 102 enables kickstand 100 to be moved to a stored or deployed position past protrusion 114 without breaking or damage. In some embodiments, support 102 may be somewhat flexible, such as by use of flexible material and/or due to notch 110, to allow it to cooperate with protrusion 114 for moving between stored and deployed positions. The extent to which kickstand 100 may be rotated once past protrusion 114 in a deployed position may not be limited, may depend on an additional stop or structure (not illustrated), or may be determined by the configuration of either or both of hinges 106*a* or 106*b*.

Furthermore, it should be understood that other mechanisms may be used to retain kickstand 100, provided such mechanisms are compatible with the presence of antenna 108.

In embodiments, hinges 106*a* and 106*b* may be simple holes to receive a corresponding pin or protrusion from support 102, or may be pins that insert into a corresponding hole in support 102. In such embodiments, the position of the kickstand 100 once placed into a deployed position may be determined by the position and size of protrusion 114, upon which support 102 will rest, as will be seen in FIG. 2B below. In other embodiments, hinges 106*a* and 106*b* may be equipped with springs and/or other structures to bias kickstand 100 into a particular position, or may be configured to provide sufficient resistance against movement so that the kickstand 100 can be placed into a desired position, and the computer device held in the desired position against the weight of the computer device combined with normal usage forces. In still other embodiments, hinges 106*a* and/or 106*b* may include stops to limit the travel of kickstand 100. In some embodiments, hinges 106*a* and 106*b* may allow kickstand 100 to rotate from 0 degrees (stored) to past 90 degrees, and may approach 180 degrees, depending upon the configuration of base 104 and how kickstand 100 is secured to base 104.

Also visible in FIG. 1C is a micro-switch 116. Micro-switch 116 protrudes into the path of kickstand 100, and is depressed or actuated when kickstand 100 is placed into a stored position. Thus, micro-switch 116 can be used to signal the computer device when kickstand 100 is stored or deployed, enabling the computer device to determine when antenna 108 should be used. This behavior will be discussed in greater detail below with reference to FIG. 6. It should also be understood that a mechanism other than a micro-switch may be used to generate the necessary signal to the computer device. For example, one or both of hinges 106*a*, 106*b* may be configured with a sensor, or a Hall effect sensor may be employed to work with support 102, to name another possible example. Any suitable mechanism for indicating whether the kickstand 100 is deployed may be used.

Figure 1D:
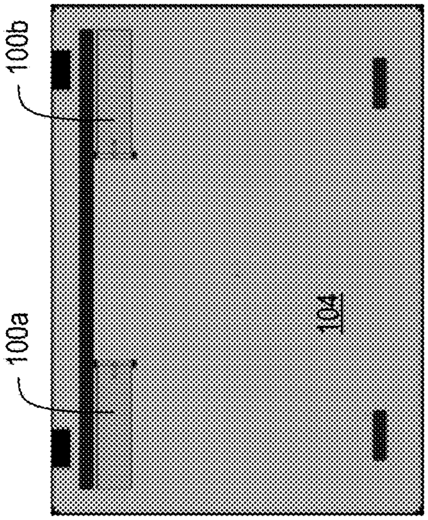
FIG. 1D illustrates one possible configuration of a computer device employing two of the example kickstands of FIG. 1A, according to various embodiments.

FIG. 1D illustrates an example embodiment laptop computer with two kickstands 100*a* and 100*b* positioned on the base 104 of the computer, that would sit below the laptop's keyboard. One or both of the kickstands 100 may be equipped with an embedded antenna 108, depending on how the laptop is configured. For example, the laptop may be configured for diversity reception, which employs two antennas; in such a configuration, each of the kickstands 100 may include an embedded antenna 108. In other configurations, only one of the kickstands 100 may include an embedded antenna 108, with the remaining kickstand 100 lacking an antenna. It will be understood that where a kickstand 100 lacks an embedded antenna, it will also lack a corresponding feed cable 112. However, all other structures of kickstand 100 may otherwise remain the same, e.g. the presence of notch 110 in support 102, interaction with protrusion 114, and the connection with hinges 106*a* and 106*b*. This example embodiment will be discussed in greater detail below with respect to FIGS. 3A and 3B.

The specific dimensions of kickstand 100 such as length, width, and thickness, the extent to which kickstand 100 may extend away from base 104, and the number of kickstands 100 will depend upon the specifics of a given implementation, including factors such as the size and weight of the computer device implementing kickstand 100. Although kickstand 100 is illustrated as rectangular in the depicted embodiment, kickstand 100 may be made in a variety of different shapes, depending upon the needs of a given implementation. Furthermore, the size of kickstand 100 may vary subject to the needs of a given implementation and the size requirements of antenna 108. Support 102 may be manufactured from any suitable material that is compatible with antenna 108. Such materials may include plastics, composites, wood, ceramics, or another material that works with antenna 108, or any combination of the foregoing. In some embodiments, support 102 may be manufactured at least partially from a glassed-filled resin.

Figure 2A:
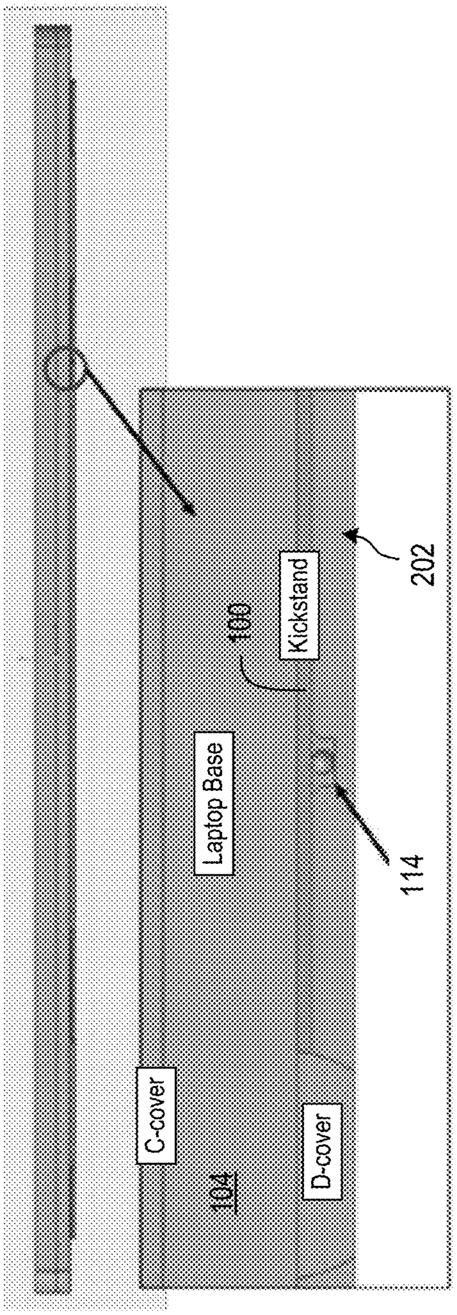
FIG. 2A illustrates the example kickstand of FIG. 1A in a stowed position within a computer device base, according to various embodiments.

FIGS. 2A and B illustrate the interaction of kickstand 100 with base 104, protrusion 114, and micro-switch 116. As can be seen in FIG. 2A, in the depicted embodiment kickstand 100 is retained into a recess 202 in base 104 when in a stored position by protrusion 114. By storing into recess 202, kickstand 100 is kept flush or below the plane of the surface of base 104, so that it does not affect the height of the computer device. As can be seen, protrusion 114 retains kickstand 100 in its stored position by resting on top of the surface of kickstand 100 that faces away from base 104. Also, micro-switch 116 is covered, providing a signal to the computer device that the kickstand 100 is stowed.

Figure 2B:
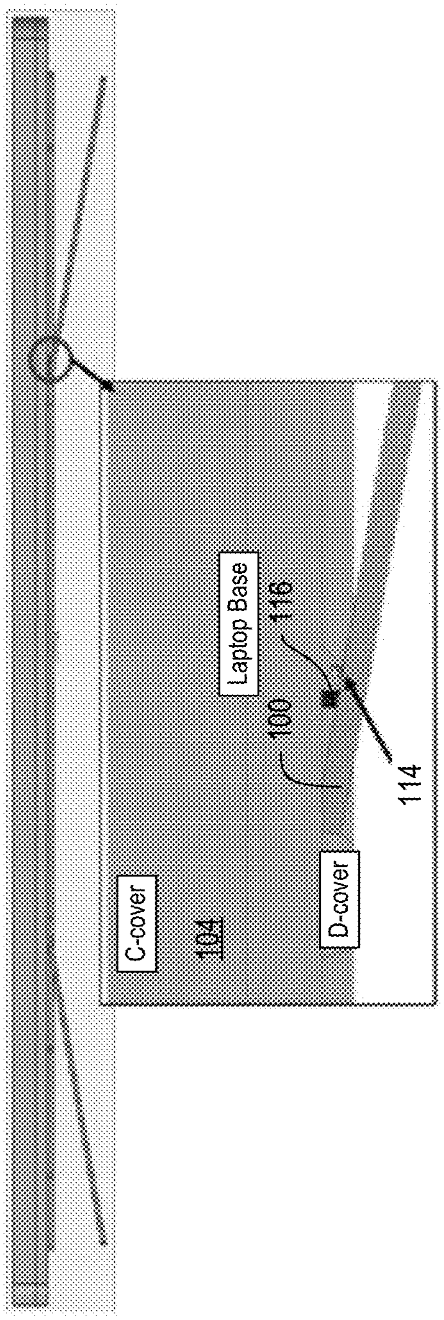
FIG. 2B illustrates the example kickstand of FIG. 1A in a deployed position and its interaction with the retention tab and micro switch of FIG. 1C, according to various embodiments.

In FIG. 2B, the kickstand 100 is deployed, having been moved past protrusion 114. As can be seen in the inset, micro-switch 116 is now uncovered from kickstand 100, providing a signal to the computer device that kickstand 100 is deployed. The surface of kickstand 100 that faces towards base 104 rests upon protrusion 114, keeping it in a deployed configuration. Also visible in FIG. 2B is a second kickstand 100, both in deployed position, to place the computer device into a more ergonomic position for use.

Figure 3A:
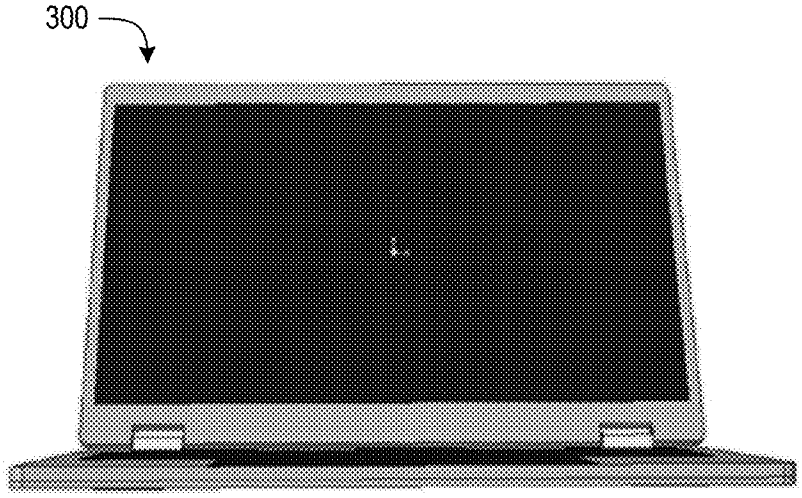
FIGS. 3A and B illustrate a computer device equipped with the example kickstand of FIG. 1A in stowed (FIG. 3A) and deployed (FIG. 3B) positions, according to various embodiments.
Figure 3B:
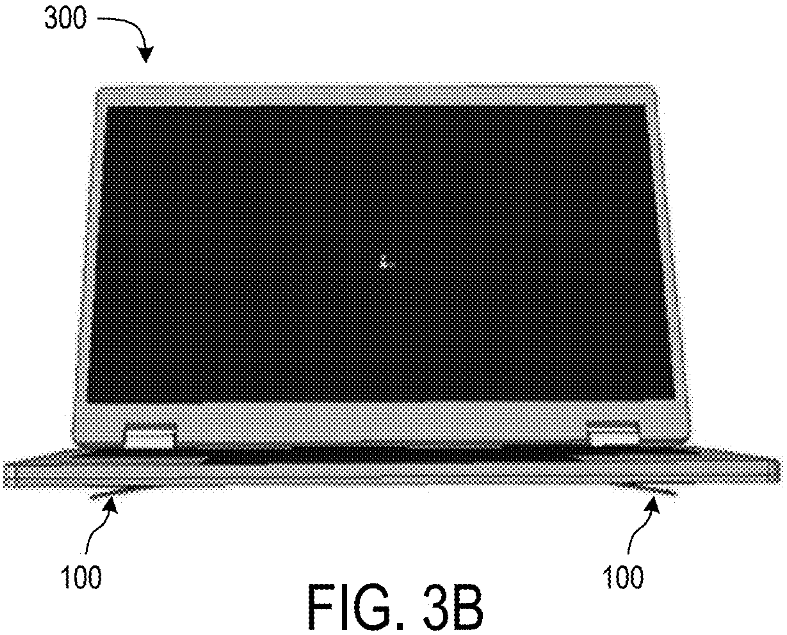

FIGS. 3A and 3B illustrate an example computer device 300, a laptop, equipped with two kickstands 100. In FIG. 3A, the kickstands are not visible, as they are in a stored position. As can be seen, the computer device 300 sits as a conventional laptop would sit, as the kickstands 100 are stored within a recess, such as recess 202 depicted in FIGS. 2A and 2B. With the kickstands 100 deployed as seen in FIG. 3B, the computer device 300 would be angled down. The kickstands 100 in the depicted embodiment are positioned proximate to the screen hinge, and so would cause the keyboard to tilt down towards the user. This tilt approximates the angle that a typical desktop keyboard would provide, which is more comfortable and ergonomically correct compared to the flat plane that a typical laptop would present that does not have kickstands 100, or that computer device 300 presents if the kickstands 100 are stored, as depicted in FIG. 3A. In some embodiments, kickstands 100 may secure to computer device 300 with hinges that allow kickstands 100 to be positioned at a particular angle within a range of angles, and hold the positioned angle against the weight of computer device 300 and any normal usage of computer device 300 by a user. When kickstands 100 can be adjusted within a range of angles, the tilt of computer device 300 can be adjusted so that a given user can place the computer device 300 at a position the user finds most comfortable.

Figure 4A:
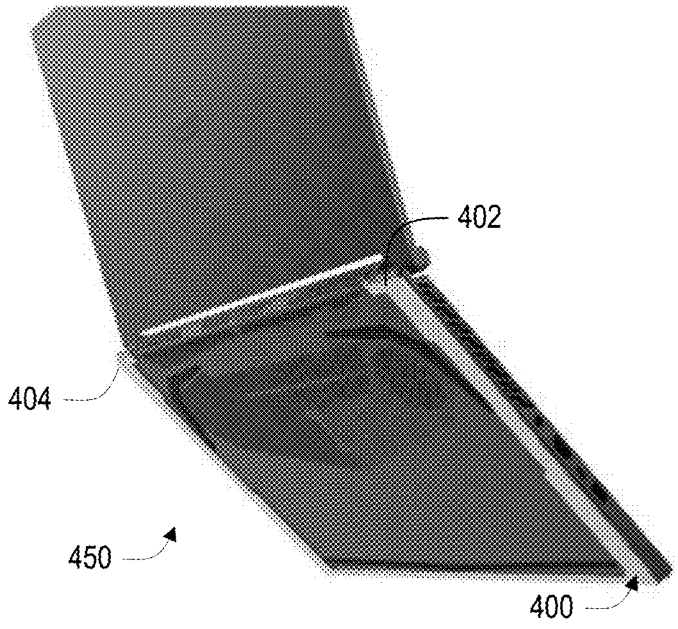
FIGS. 4A and B illustrate a computer device equipped with a second example kickstand in stowed (FIG. 3A) and deployed (FIG. 3B) positions, according to various embodiments.
Figure 4B:
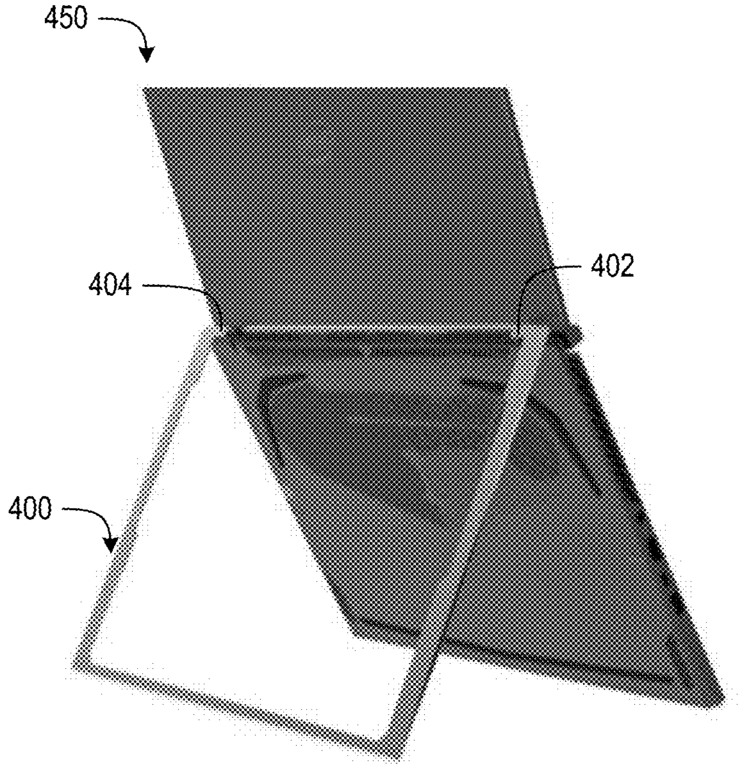

FIGS. 4A and 4B depicted a second possible embodiment of a kickstand 400 equipped to a computer device 450. In the depicted embodiment, kickstand 400 is a single piece that frames around the perimeter of the computer device 450. The kickstand 400 attaches to computer device 450 at display hinges 402 and 404. In FIG. 4A, the kickstand 400 is in a stored position. In FIG. 4B, kickstand 400 is in a deployed position, and so allows the computer device 450 to be positioned in a substantially vertical orientation, which may be useful for presentations and/or if the screen of computer device 450 is a touch screen. Although not illustrated, the kickstand 400 may be adjustable from a 0 degree stored position to an obtuse angle such as 140 degrees or approach 180 degrees. When rotated past 90 degrees, it will be understood by a person skilled in the relevant art that kickstand 400 will allow computer device 450 to have a tilt that approximates the forward tilt depicted in FIG. 2B with kickstands 100, but using a single kickstand that may provide greater stability.

Hinges 402 and 404 may be configured similar to hinges 106*a* and 106*b* depicted in FIG. 1B, and may provide resistance sufficient to hold the kickstand 400 at a desired angle against the weight of the computer device 450 and forces from the normal use of computer device 450. Hinges 402 and 404 may further be part of the display hinge or hinges that may be equipped to a laptop computer, as is known in the art. As with kickstand 100, kickstand 400 may include an integrated antenna. The cable from the computer device 450 connecting to the integrated antenna may be passed through one of the hinges 402 or 404, rather than a notch as used with kickstand 100. In some embodiments, kickstand 400 may be equipped with two integrated antennas, with a cable passed through each of hinges 402 and 404 connecting to each separate antenna, or a both cables passing through either hinge 402 or 404 depending on the specifics of how a given computer device 450 is implemented. Dual antennas may provide diversity reception for computer device 450 that, in conjunction with the placement of the antennas in kickstand 400, may provide computer device 450 with significantly enhanced wireless reception over a computer device equipped only with internal antennas.

Figure 5A:
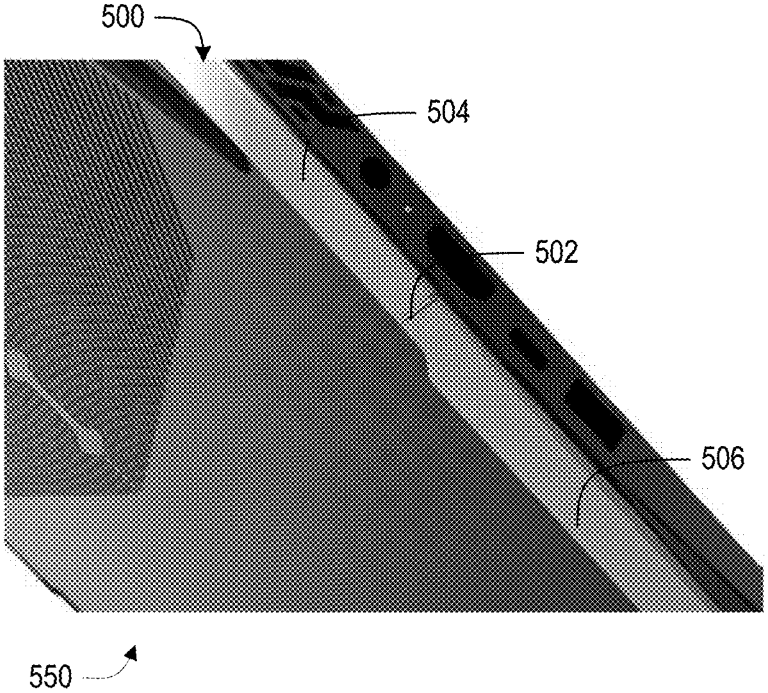
FIGS. 5A and B illustrate a computer device equipped with a third example kickstand that is hinged, in stowed (FIG. 3A) and deployed (FIG. 3B) positions, according to various embodiments.
Figure 5B:
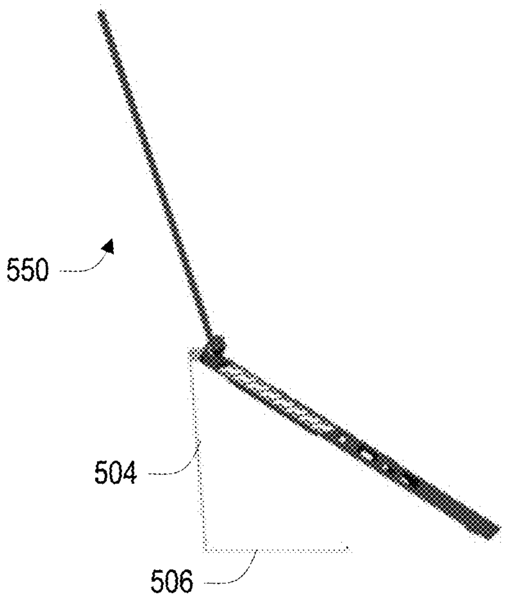

FIGS. 5A and 5B illustrate a third possible embodiment of a kickstand 500. Kickstand 500 is substantially similar in configuration to kickstand 400 depicted in FIGS. 4A and 4B. However, in contrast to kickstand 400, kickstand 500 is equipped with a hinge 502, dividing kickstand 500 into an upper section 504 and a lower section 506. Upper section 504, as can be seen, connects to the computer device 550 at the display hinges, similar to kickstand 400, and any cables for antennas embedded into kickstand 500 may be routed through the display hinges. When in a stored position, as illustrated in FIG. 5A, hinge 502 is flat and the upper and lower sections 504 and 506 are substantially in-line, similar to the configuration of kickstand 400.

In FIG. 5B, kickstand 500 is in a deployed position, and the lower section 506 is hinged away from the upper section 504 at an approximate right angle, bending at hinge 502. This allows substantially all of lower section 506 to contact the surface upon which computer device 550 is resting. As a result, the computer device 550 can be positioned at a lower angle compared to kickstand 400 on computer device 450. To achieve a similar angle and height of computer device 450 with kickstand 400, the kickstand 400 would need to be placed at an obtuse angle, such as around 130-140 degrees. This would result in kickstand 400 protruding away from computer device 450. In contrast, the hinge 502 that allows lower section 506 to fold towards the base of computer device 550 provides a lower angle while keeping the stand footprint within the footprint of computer device 550, making kickstand 500 preferable in locations where surface space is at a premium, such as an airplane tray table.

As with kickstand 400, kickstand 500 may be adjustable from a 0 degree storage position to nearly 180 degrees. Hinge 502 may, in embodiments, allow lower section 506 to fold from a 0 degree position, where sections 504 and 506 are inline, as shown in FIG. 5A, to nearly 180 degrees, where lower section 506 folds back upon upper section 504. Hinge 502 may, in embodiments, provide some measure of resistance so that lower section 506 can be maintained at a desired angle until intentionally repositioned. It should thus be understood by a person skilled in the relevant art that the combination of display hinge and hinge 502 may allow kickstand 500 to be folded into a variety of positions to achieve a range of desired ergonomic angles for computer device 550 while still maintaining a footprint comparable to a laptop equipped with, for example, kickstands 100.

Figure 6:
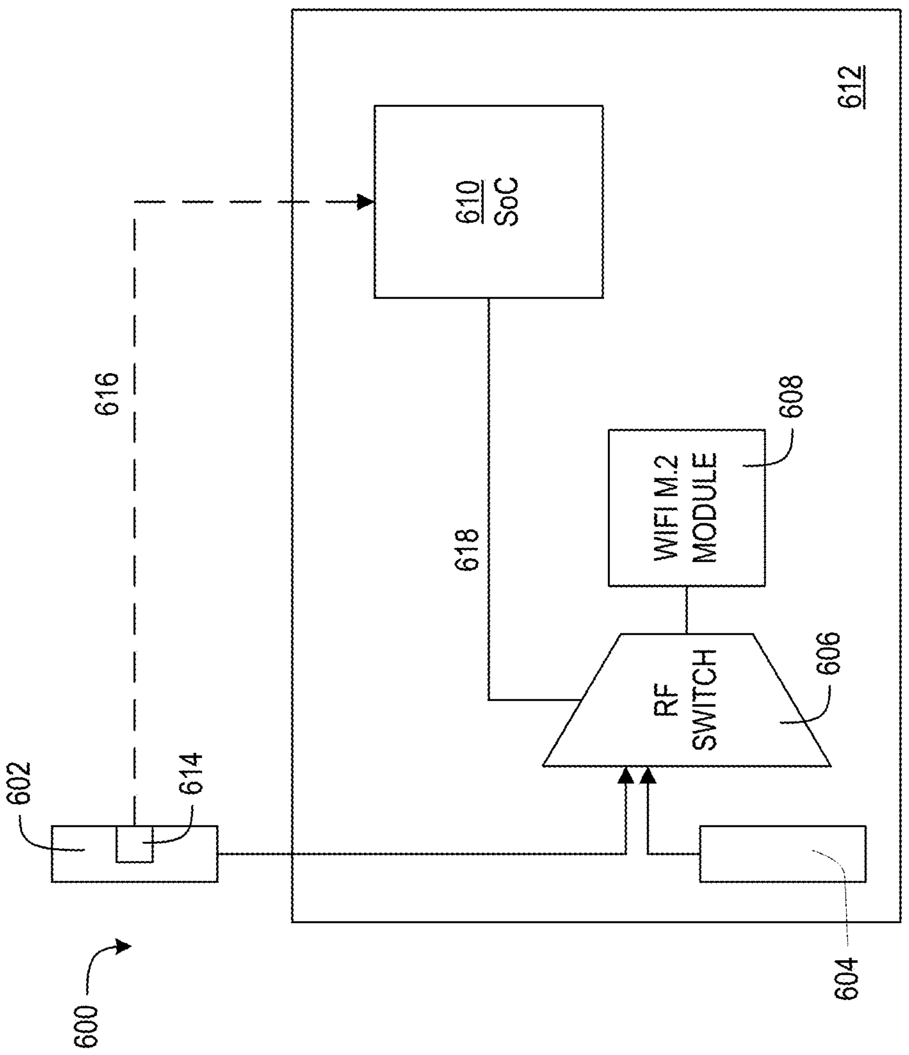
FIG. 6 illustrates a block diagram of example control circuitry that may be used to switch between an internal antenna and an external antenna in a kickstand, such as the example kickstand of FIG. 1A, according to various embodiments.

In FIG. 6, a block diagram 600 of example electronic components that may be used to switch between an external antenna 602, which may be embedded in or attached to a kickstand such as kickstand 100, 400, or 500, and an internal antenna 604, which may be equipped to a computer device. In the depicted embodiment, both antennas 602 and 604 are connected to an RF switch 606, which in turn is connected to a radio 608, which is a WiFi module in the depicted embodiment. In other embodiments, the radio 608 may be a transceiver for any suitable type of wireless communications technology, such as Bluetooth, a cellular connection such as LTE or 5G, or another suitable wireless technology. The RF switch acts to selectively connect the radio 608 to either external antenna 602 or internal antenna 604, and may be selected with regard to the type of wireless transmissions generated by radio 608. Selection of the antenna by the RF switch may be controlled by a controller 610, illustrated as a System on a Chip (SoC), which may be part of a computer device 612.

Controller 610 connects to RF switch 606 via a communication line 618, which may be a general-purpose input/output (GPIO) interface, or an interface specifically designed to work with RF switch 610. Depending on the signal provided via communication line 618, the RF switch can toggle between the external antenna 602, the internal antenna 604, or, depending upon the specifics of a given embodiment, both antennas simultaneously. In embodiments, controller 610 controls RF switch 606 based on a signal received from a micro-switch 614 that interacts with external antenna 602, over signal line 616. External antenna 602, as will be understood, may be mounted on a support, such as support 102 of kickstand 100, kickstand 400, or kickstand 500, which itself interacts with micro-switch 614. When controller 610 is signaled via micro-switch 614 that the external antenna 602 is in a deployed position (such as when its associated kickstand is deployed), then controller 610 may signal RF switch 606 to switch the radio 608 to send and receive signals through external antenna 602. Likewise, when controller 610 is signaled via micro-switch 614 that the external antenna 602 is in a stored position, then controller 610 may signal RF switch 606 to switch the radio 608 to send and receive signals through internal antenna 604. The controller 610 may be a standalone control chip dedicated to the RF switch 606, part of a subsystem of computer device 612 that provides several different functions, or as a SoC that serves as the main processor of computer device 612, depending upon the needs of a given implementation and the specifics of computer device 612. While a micro-switch 614 is illustrated, micro-switch 614 could be implemented as any suitable type of sensor that can detect when external antenna 602 is in deployed or stored positions. Furthermore, the logic employed by controller 610 may be hard-wired, such as via an FPGA or discrete components, or may be implemented using firmware or software that executes on controller 610. In some embodiments, the software may be part of an operating system, and a user of computer device 612 may be able to manually toggle the RF switch 606 via an operating system interface.

It should further be understood that the example diagram 600 may be applicable to implementations that use multiple external antennas 602 and/or internal antennas 604. For example, RF switch 606 may switch between a plurality of external antennas 602 and/or a plurality of internal antennas 604 when diversity reception is employed. In other embodiments, RF switch may allow signals to come from both external antenna(s) 602 and internal antenna(s) 604 when external antenna(s) 602 is/are deployed, and only from internal antenna(s) 604 when the external antenna(s) is/are stored. Furthermore, multiple radios 608 may be employed and connected to RF switch where external antenna(s) 602 support multiple types of wireless transmissions, e.g. Bluetooth, WiFi, and/or cellular transmissions. In still other embodiments, multiples of components in diagram 600 may be utilized, e.g. multiple radios 608 and multiple RF switches 606.

Figure 7:
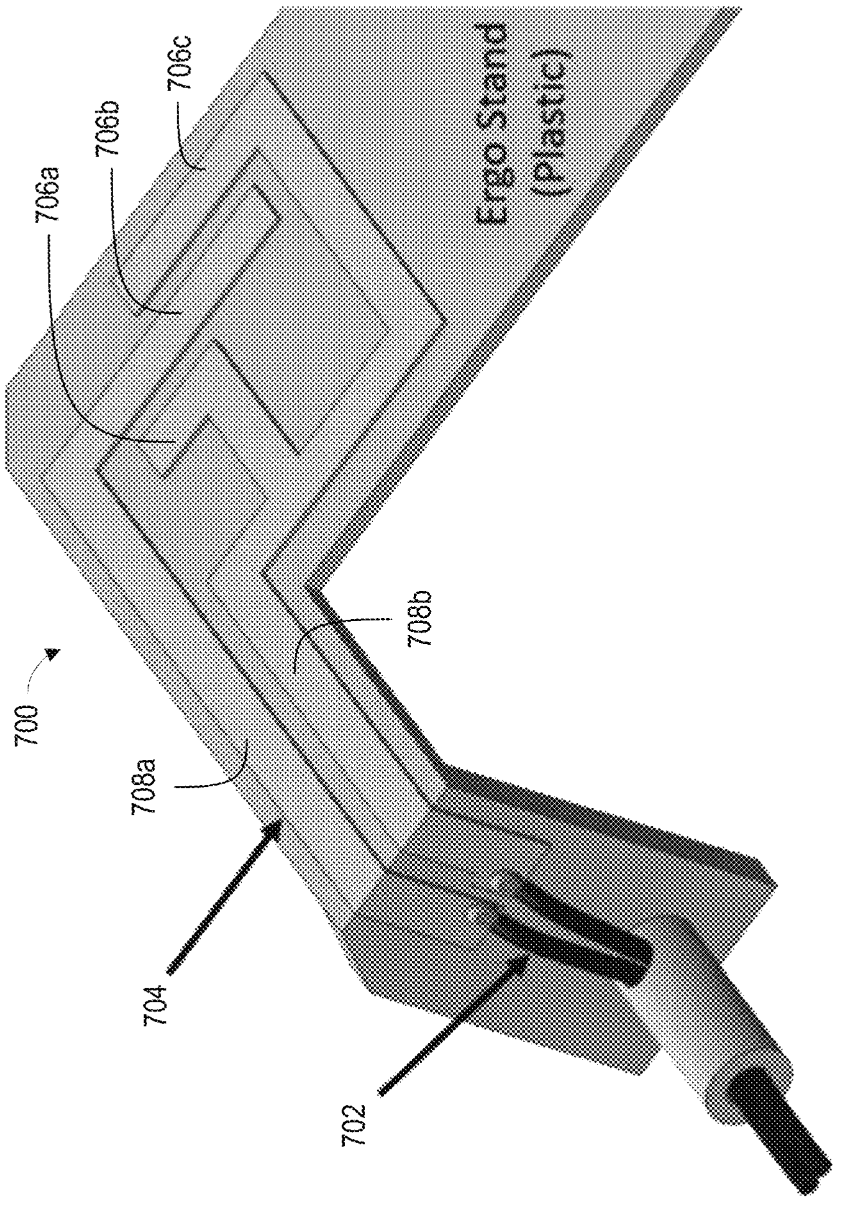
FIG. 7 illustrates an example antenna configuration that may be employed with a kickstand, such as the example kickstand of FIG. 1A, according to various embodiments.

FIG. 7 depicts the configuration of an example antenna 700, such as may be embedded or secured to the support of a kickstand, such as kickstand 100, 400, or 500. Antenna 700 may be fabricated from foil strips, deposited metal, printed metal, silk screened and etched, or any other suitable way to create and/or adhere the necessary pattern of antenna 700 on the support substrate. As discussed above, although depicted on the surface of the support, antenna 700 may be embedded or encased within the support in some embodiments. Antenna 700 is fed from a radio via lines 702, which may be shielded to minimize RF energy loss. Lines 702 are adhered, such as by soldering or another suitable means of electrical attachment, to feed line 704. Feed line 704 is comprised of feeders 708*a* and 708*b*, which in turn feed to and return from radiating elements 706*a*, 706*b*, and 706*c*. Radiating elements 706*a*, 706*b*, and 706*c* are sized and positioned to effectively transmit and receive RF energy on bands that correspond to those used by the attached radio. For example, where the radio is a WiFi radio, radiating elements 706*a*, 706*b*, and 706*c* may be sized to effectively transmit and receive RF energy in the 2.4 GHz and/or 5 GHz bands commonly used for WiFi transmissions. For WiFi transmission, an antenna size of approximately 17 mm by 15 mm may provide acceptable transmission and receipt of common WiFi signal bands.

It will be recognized that radiating element 706*a* is the shortest element, radiating element 706*b* is the longest element, and radiating element 706*c* is approximately medium. Radiating elements 706*a* and 706*c* are electrically connected with feedline 708*b*, while radiating element 706*b* is electrically connected with feedline 708*a*. Neither radiating element 706*a* or 706*c* contact or are electrically connected to radiating element 706*b*, being separated by a non-conductive gap. Thus, feeder 708*a* is not physically in continuity with feeder 708*b*. However, lines 702 and feed line 704 are paired, via feeders 708*a* and 708*b*, due to the alternating current (AC) nature of the RF energy, as will be understood by a person skilled in the relevant art. The lack of direct connection between the feeders 708*a* and 708*b* results in antenna 700 providing capacitance which helps tune the antenna 700 to the desired wavelengths to be sent and received, as will be understood, and function correctly with the attached radio.

Figure 8A:
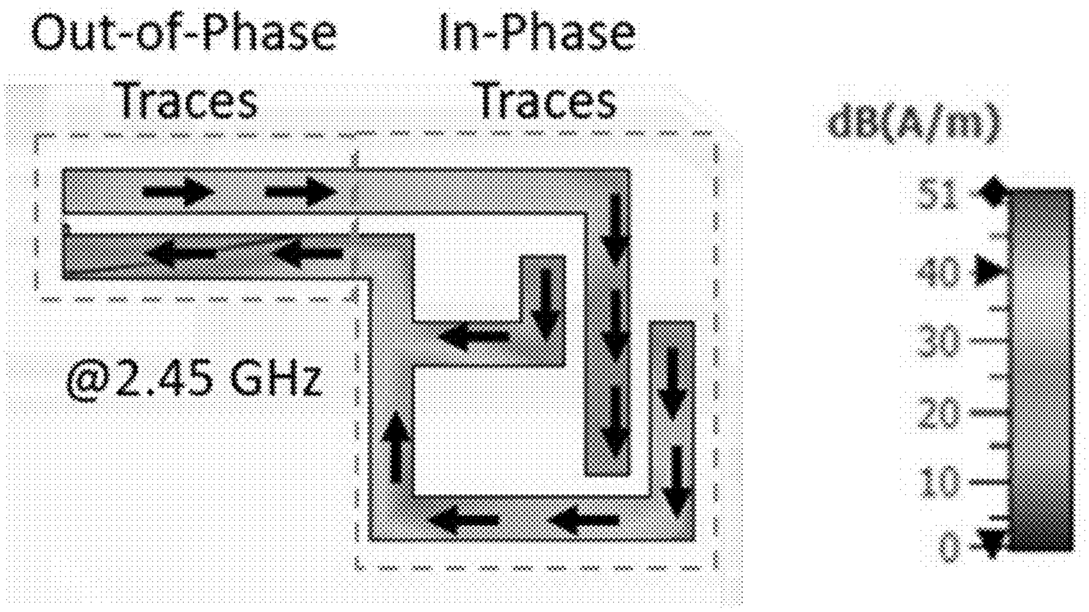
FIGS. 8A and B illustrate the current flow and signal strength of the example antenna configuration of FIG. 7 at 2.45 GHz (FIG. 8A) and 5.5 GHz (FIG. 8B), according to various embodiments.
Figure 8B:
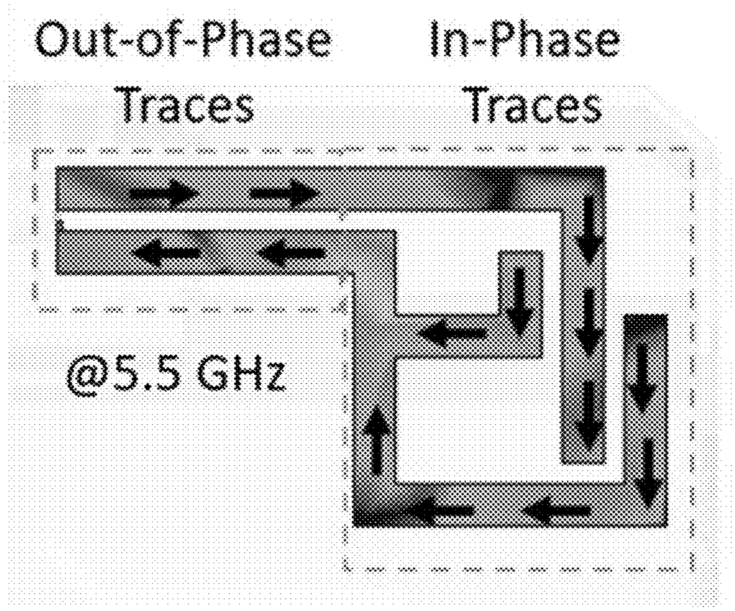

FIGS. 8A and 8B illustrate the current flow of antenna 700 depicted in FIG. 7, along with the reception/transmission strength of the various radiating elements at both the 2.45 GHz WiFi band and the 5.5 GHz WiFi band. As can be seen, the feeders, due to the AC nature of the RF feed, will have current traveling in opposing directions, thereby radiating out-of-phase and preventing the feeders from adversely affecting the signal radiated from or received by the radiating elements. Due to the right angle bends from the feed lines and the parallel orientation of the radiating elements, signals radiated or received from the radiating elements are constructively enhanced, e.g. the signal radiated from the different length radiating elements act in a constructive, in-phase fashion to boost both transmission and receipt. For the longer wavelength of 2.45 GHz, as can be seen, all three radiating elements act in concert to provide an effective antenna length suitable to the 2.45 GHz wavelength. For the shorter 5.5 GHz band, the shorter radiating elements act in tandem, while the longer radiating element contributes comparatively little to the signal, as the shorter wavelength of the 5.5 GHz band does not require the longer radiating element. Thus, the antenna 700 is designed to work effectively at both the 2.45 GHz and 5.5 GHz frequency bands.

Figure 9:
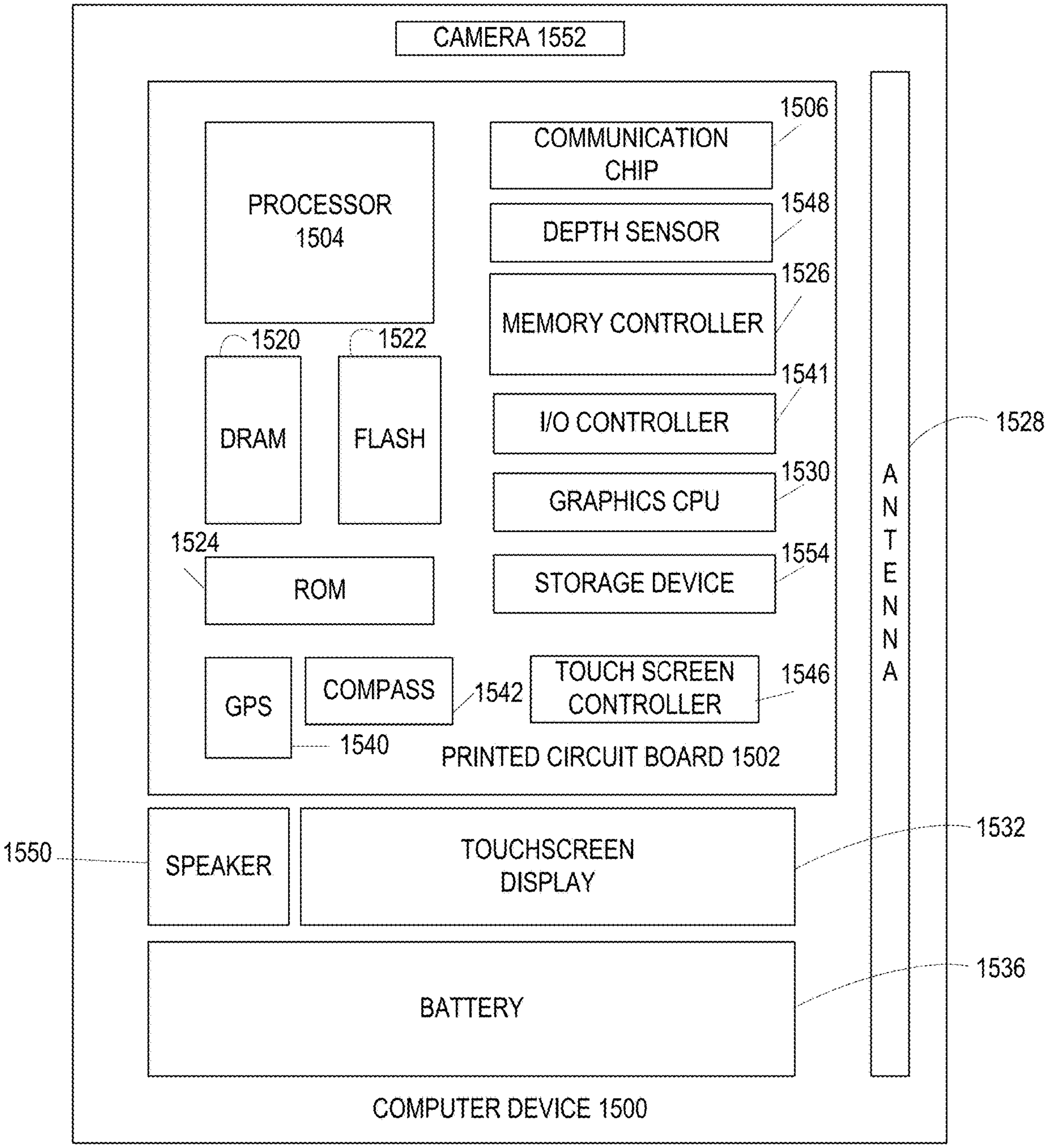
FIG. 9 is a block diagram of an example computer that can be used to implement some or all of the components of the disclosed systems and methods, according to various embodiments.

FIG. 9 illustrates an example computer device 1500 that may be employed by the apparatuses and/or methods described herein, in accordance with various embodiments. As shown, computer device 1500 may include a number of components, such as one or more processor(s) 1504 (one shown) and at least one communication chip 1506. In various embodiments, one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a depth sensor 1548, a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 10:
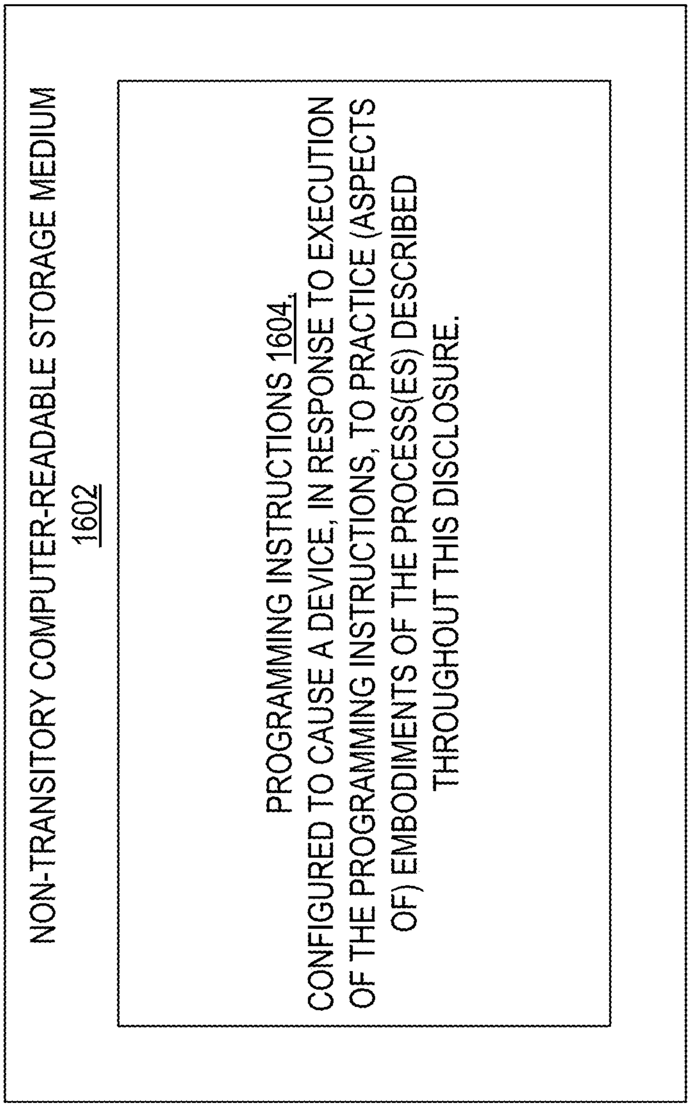
FIG. 10 is a block diagram of a computer-readable storage medium that can be used to implement some of the components of the system or methods disclosed herein, according to various embodiments.

FIG. 10 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) the various embodiments described above. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

EXAMPLES

The following are various additional example embodiments.

Example 1 is a kickstand for a computer device, comprising a support with a first end and a second end, the second end configured to pivot when secured to the computer device; and an antenna for sending and receiving wireless transmissions, the antenna embedded within the support, wherein the kickstand is configured to interact with a base of the computer device to be retained in either a stored position or a deployed position.

Example 2 includes the subject matter of example 1, or another example herein, wherein the support is made from glass-reinforced plastic.

Example 3 includes the subject matter of example 1 or 2, or another example herein, wherein the first end is configured to pivot when secured to the computer device.

Example 4 includes the subject matter of any of examples 1-3, or another example herein, wherein the kickstand is adjustable from 0 degrees to 140 degrees relative to a plane defined by a computer device base when the support is secured to the base.

Example 5 includes the subject matter of any of examples 1-4, or another example herein, wherein the antenna is 17 mm by 15 mm in dimension.

Example 6 includes the subject matter of any of examples 1-5, or another example herein, wherein the support is comprised of a non-conductive material; and the antenna is at least partially formed from metal deposited on the non-conductive material.

Example 7 includes the subject matter of any of examples 1-6, or another example herein, wherein the antenna comprises a plurality of in-phase traces and a plurality of out-of-phase traces.

Example 8 is a computer device, comprising a base; a support coupled to the base such that the stand can rotate away from the base; an antenna for sending and receiving wireless transmissions with the computer device, the antenna embedded within the support; and a retention mechanism configured to selectively retain the support to the base.

Example 9 includes the subject matter of example 8, or another example herein, wherein the antenna is a first antenna, and the computer device further comprises a second antenna disposed within the computer device; and switching circuitry to switch between the first antenna and the second antenna.

Example 10 includes the subject matter of example 9, or another example herein, further comprising a sensor to detect when the support is retained to the base, and wherein the switching circuitry is to switch to the first antenna when the support is rotated away from the base, and switch to the second antenna when the support is retained to the base.

Example 11 includes the subject matter of any of examples 8-10, or another example herein, wherein the support is coupled to the base at a plurality of points.

Example 12 includes the subject matter of any of examples 8-11, or another example herein, wherein the support can rotate from flush with the base to 140 degrees away from a plane defined by the base.

Example 13 includes the subject matter of any of examples 8-12, or another example herein, wherein the base comprises a recess sized to receive the support such that a surface of the support is flush with a plane defined by the base when the support is within the recess.

Example 14 includes the subject matter of example 13, or another example herein, wherein the recess further comprises a plurality of apertures that are positioned such that the plurality of apertures are exposed when the support is rotated away from the base.

Example 15 includes the subject matter of example 13 or 14, or another example herein, wherein the base further comprises a protrusion positioned relative to the recess to retain the support within the recess.

Example 16 includes the subject matter of any of examples 8-15, or another example herein, further comprising a hinge that rotatably couples the support to the base, and wherein the antenna is connected to a transceiver within the computer device via a cable that passes through the hinge.

Example 17 includes the subject matter of any of examples 8-16, or another example herein, wherein the support is comprised of a non-conductive material; and the antenna is at least partially formed from metal deposited on the non-conductive material.

Example 18 includes the subject matter of any of examples 8-17, or another example herein, wherein the computer device is a laptop or tablet computer.

Example 19 is an antenna, comprising a plurality of out-of-phase traces; and a plurality of in-phase traces, each of the plurality of in-phase traces formed off one of the out-of-phase traces; wherein each of the traces is comprised of a metal foil that is disposed upon a kickstand for a computer device, and each of the plurality of out-of-phase traces is separated by a non-conductive gap.

Example 20 includes the subject matter of example 19, or another example herein, wherein at least a portion of the plurality of out-of phase traces are oriented parallel to each other.

Example 21 includes the subject matter of example 19 or 20, or another example herein, wherein the in-phase traces are optimized to receive and radiate radio frequency transmissions in 2.4-2.5 GHz and 5-7 GHz bands.

What is claimed is:

1. A kickstand for a computer device, comprising:

a support with a first end and a second end, the second end configured to pivot when secured to the computer device; and an antenna for sending and receiving wireless transmissions, the antenna embedded within the support, wherein the kickstand is configured to interact with a base of the computer device to be retained in either a stored position or a deployed position, wherein the base comprises a recess sized to receive the support such that a surface of the support is flush with a plane defined by the base when the support is within the recess, and wherein the recess further comprises a plurality of apertures comprising air vents that are positioned such that the plurality of apertures are exposed when the support is rotated away from the base to enhance ventilation of the computer device.

2. The kickstand of claim 1, wherein the support is made from glass-reinforced plastic.

3. The kickstand of claim 1, wherein the first end is configured to pivot when secured to the computer device.

4. The kickstand of claim 3, wherein the kickstand is adjustable from 0 degrees to 140 degrees relative to a plane defined by athe base of the computer device base when the support is secured to the base.

5. The kickstand of claim 1, wherein the antenna is 17 mm by 15 mm in dimension.

6. The kickstand of claim 1, wherein:

the support is comprised of a non-conductive material; and the antenna is at least partially formed from metal deposited on the non-conductive material.

7. The kickstand of claim 6, wherein the antenna comprises a plurality of in-phase traces and a plurality of out-of-phase traces.

8. The kickstand of claim 1, further comprising:

a hinge that rotatably couples the support to the base, wherein the antenna is connected to a transceiver within the computer device via a cable that passes through the hinge.

9. The kickstand of claim 1, wherein the antenna is a first antenna, and the computer device further comprises:

a second antenna disposed within the computer device;

switching circuitry to switch between the first antenna and the second antenna; and a sensor to detect when the support is retained to the base, wherein the switching circuitry is to:

switch to the first antenna when the support is rotated away from the base, and switch to the second antenna when the support is retained to the base.

10. A computer device, comprising:

a base;

a support coupled to the base such that the stand support can rotate away from the base;

an antenna for sending and receiving wireless transmissions with the computer device, the antenna embedded within the support; and a retention mechanism configured to selectively retain the support to the base, wherein the base comprises a recess sized to receive the support such that a surface of the support is flush with a plane defined by the base when the support is within the recess, and wherein the recess further comprises a plurality of apertures comprising air vents that are positioned such that the plurality of apertures are exposed when the support is rotated away from the base to enhance ventilation of the computer device.

11. The computer device of claim 10, wherein the antenna is a first antenna, and the computer device further comprises:

a second antenna disposed within the computer device; and switching circuitry to switch between the first antenna and the second antenna.

12. The computer device of claim 11, further comprising a sensor to detect when the support is retained to the base, and wherein the switching circuitry is to:

switch to the first antenna when the support is rotated away from the base, and switch to the second antenna when the support is retained to the base.

13. The computer device of claim 10, wherein the support is coupled to the base at a plurality of points.

14. The computer device of claim 13, wherein the support can rotate from flush with the base to 140 degrees away from a plane defined by the base.

15. The computer device of claim 10, wherein the base further comprises a protrusion positioned relative to the recess to retain the support within the recess.

16. The computer device of claim 10, further comprising a hinge that rotatably couples the support to the base, and wherein the antenna is connected to a transceiver within the computer device via a cable that passes through the hinge.

17. The computer device of claim 16, wherein:

the support is comprised of a non-conductive material; and the antenna is at least partially formed from metal deposited on the non-conductive material.

18. The computer device of claim 10, wherein the computer device is a laptop or tablet computer.

* * * * *